United States Patent [19]

Bendig et al.

[11] 4,161,930
[45] Jul. 24, 1979

[54] DEVICE FOR REGULATING THE INTAKE AIR TEMPERATURE OF A CARBURETOR-EQUIPPED INTERNAL COMBUSTION ENGINE

[75] Inventors: Lothar Bendig, Ludwigsburg; Rolf Füsser, Freiberg am Neckar, both of Fed. Rep. of Germany

[73] Assignee: Filterwerk Mann & Hummel GmbH, Ludwigsburg, Fed. Rep. of Germany

[21] Appl. No.: 877,765

[22] Filed: Feb. 14, 1978

[51] Int. Cl.² ........................................... F02M 31/00
[52] U.S. Cl. ............................. 123/122 D; 123/122 H
[58] Field of Search ....................... 123/122 D, 122 H; 236/13

[56] References Cited
U.S. PATENT DOCUMENTS

| | | | |
|---|---|---|---|
| 3,563,007 | 2/1971 | Clarke | 123/122 D |
| 3,830,210 | 8/1974 | Muller | 123/122 D |
| 3,850,152 | 11/1974 | Hollins | 123/122 D |
| 3,888,411 | 6/1975 | Floune | 123/122 D |
| 3,918,421 | 11/1975 | Berry | 123/122 D |

Primary Examiner—Ronald H. Lazarus
Attorney, Agent, or Firm—Joseph A. Geiger

[57] ABSTRACT

A device for automatically regulating the intake air temperature of a carburetor-equipped internal combustion engine whose air intake system includes a flow proportioning pivotable flapper in a duct junction admitting cold raw air and/or preheated raw air to the air intake filter, depending on the ambient temperature, the flapper position being controlled by a pneumatic membrane actuator receiving negative pressure from the engine intake manifold, via a vacuum line with a thermostat-controlled pressure relief valve which reads the temperature of the raw air mixture. In the cold air intake duct is arranged a temperature-responsive unit, in the form of either a wax thermostat or a bimetallic spiral and disc cam, which serves as a position-adjustable stop thereby preventing the flapper from completely closing the warm air intake duct, when the engine takes in cold air, operating at full load.

7 Claims, 3 Drawing Figures

DEVICE FOR REGULATING THE INTAKE AIR TEMPERATURE OF A CARBURETOR-EQUIPPED INTERNAL COMBUSTION ENGINE

BACKGROUND OF THE INVENTION

1. Field of the Invention

The present invention relates to air intake systems for carburetor-equipped internal combustion engines and, more particularly, to an air intake system equipped with a mechanism which automatically controls the intake air temperature by adjusting a proportioning valve which mixes cold raw air with preheated raw air for the maintenance of an optimal raw air intake temperature, under changing operating conditions.

2. Description of the Prior Art

The efficiency of carburetion and combustion of an internal combustion engine is highest, when the temperature of the combustion air which is sucked into the engine cylinders, via the filter and carburetor, is maintained within a predetermined temperature range. At higher air temperatures, the engine operates at a reduced volumetric intake efficiency, while lower intake air temperatures tend to cause poor carburetion, sometimes even leading to the dreaded carburetor icing, especially under full load operation. In addition, the intake of very cold raw air will also delay the warmup of the engine during cold start, thereby prolonging operation in a poorly lubricated state. Lastly, a rapid warmup is important for ecological reasons, because the emission of exhaust pollutants is much higher, when the engine runs cold.

The preheating of cold raw intake air can be accomplished rather easily, the numerous solutions proposed for this purpose featuring all a so-called exhaust stove, where raw air is pulled through a duct or channel system whose wall or walls are heated by the hot exhaust gasses. The exhaust stove is therefore preferably associated with the exhaust manifold of the internal combustion engine. A warm air duct connects this exhaust stove with the raw air intake duct, at a junction point located upstream of the air intake filter. Using a suitable proportioning valve, the intake air temperature can thus be adjusted by increasing or decreasing the flows of preheated raw air and of cold raw air which are admitted into the raw air mixing duct which leads to the air intake filter.

A number of prior art air intake systems utilize as a proportioning valve a simple pivotable flapper which, in one end position, closes the warm air duct and opens the cold air duct and, in the other end position, closes the cold air duct and opens the warm air duct. The adjustment drive for the flapper is in many cases a pneumatic membrane actuator which is driven by negative air pressure which is derived from the air intake manifold, downstream of the carburetor, via a vacuum line.

This comparatively simple arrangement is subject to several operational problems which are due, on the one hand, to considerable variations in the level of negative air pressure which is available in the manifold and, on the other hand, to the need for continuously measuring the intake air temperature and for quickly adjusting the flow rates of cold raw air and warm raw air accordingly. The negative air pressure in the intake manifold is highest, when the carburetor throttle is closed, i.e. when the engine is idling, and it is lowest, when the throttle is completely open and the engine operates under full load. In the latter case, the pneumatic membrane actuator is virtually ineffective.

One prior art system of the type described above is disclosed in U.S. Pat. No. 3,726,512, which suggests a flapper-type valve at the junction between the cold air duct and the warm air duct, the pivotable flapper being driven by a pneumatic membrane actuator. In the vacuum line between the engine manifold and the pneumatic actuator is arranged a thermostat-controlled pressure relief valve whose thermostat member is exposed to the temperature of the mixed raw air in the clean air space of the air intake filter. At low ambient temperatures, the relief valve remains closed, so that the negative air pressure of the manifold is transmitted to the pneumatic actuator which responds by pivoting the flapper in the direction of closing the cold air duct and opening the warm air duct. At higher ambient temperatures, the thermostat-controlled relief valve progressively opens an outlet which reduces the negative pressure as it is being transmitted to the flapper actuator, thereby allowing an actuator return spring to pivot the flapper in the direction of opening the cold air duct and closing the warm air duct. Such a system is intended to stabilize at the desired intake temperature. A major shortcoming of this prior art solution is that it is ineffective under full load operation, because of the virtual absence of negative pressure. This condition brings with it the risk of carburetor icing, especially at air temperatures which are just slightly above the freezing point.

Another prior art device is proposed in German Pat. No. 20 09 236, where a similarly arranged flapper is resiliently biased in the direction of closing the cold air duct and opening the warm air duct, moving in the opposite direction, under the flow impact of the air which is being sucked into the engine, so that an increase in total air consumption will increase the flow of cold air and decrease the flow of warm air. The bias on the flapper is obtained with either gravity or a spring. To the flapper is also connected a wax thermostat which, while allowing for a flow-induced movement range of the flapper through a lost motion connection, shifts this range in response to the intake air temperature: A temperature increase will shift the movement range of the flapper in the direction of closing of the warm air duct. This arrangement would seem to eliminate the risk of full load icing, at least theoretically. It has been found, however, that the wax thermostat is responding too slowly for an effective adaptation of the flapper position to changing operating conditions of the engine. Furthermore, it has also been observed that, in its position just behind the air duct junction, the wax thermostat may be exposed to air of a temperature which does not correspond to the temperature of the combined raw air flows, when unmixed currents of colder or warmer air impinge on the thermostat, thereby distorting its response.

Another prior art solution, disclosed in U.S. Pat. No. 3,450,119, features a similar arrangement with a pivotable flapper which is spring-biased towards a position in which the cold air duct is closed and the warm air duct is fully opened. A wax thermostat engages the pivotable flapper with a one-way lost motion connection, thereby acting as an adjustable stop which opposes the flapper movement under the aforementioned spring bias. Also connected to this flapper is a pneumatic actuator whose return spring is opposed to and stronger than the flapper spring. This means that, under full load operation of the engine, the warm air duct is completely closed, regardless of the ambient air temperature, so that the same risk of carburetor icing exists here as in the previously described prior art solutions. Furthermore, the complexity of this arrangement reflects itself in increased production costs, greater risk of malfunction and/or improper adjustment. The numerous connection points between driving and driven parts, converting straight-line motions into angular motions, are subject to friction, with the result that the response of this mechanism is hesitant and lagging, depending on the direction of response.

SUMMARY OF THE INVENTION

Underlying the present invention is the primary objective of providing an improved raw air temperature control device of the type described above which, while being simple in design and operation, avoids at least some of the shortcomings of the prior art solutions.

The present invention proposes to attain this objective by suggesting an air temperature controlling device which features, in addition to the known flow proportioning flapper, a thermostatic member which is exposed to the cold raw air and which acts as an adjustable movement stop for the flapper, limiting the pivoting freedom of the latter in the direction of closing the warm air duct.

The proposed device thus makes it possible to reliably prevent the condition of carburetor icing under full load, when, due to inadequate negative pressure, the pneumatic membrane actuator is ineffective in opening the warm air duct, even though the cold raw air has a temperature which is below the optimal level. Because the temperature conditions in the cold air duct change very little and only gradually, the thermostatic member can be of the type which responds slowly, but which is capable of exerting an elevated positioning force.

While it is normally preferable to arrange the thermostatic member inside the cold air duct, in order to reliably measure the temperature of the raw air which is being sucked into the engine, it is also possible to arrange this thermostatic member outside the air duct system, provided it is not exposed to a temperature which is appreciably different from that of the raw air.

In a preferred embodiment of the invention, the thermostatic member is a wax thermostat which is arranged in the cold air intake duct, a short distance upstream of the pivot axis of the flapper, in a generally transverse orientation thereto. The wax thermostat forms a temperature-responsive stop for the flapper which, depending on the temperature of the incoming raw air, maintains a variable minimum opening at the inlet of the warm air intake duct. The invention suggests that the wax thermostat be so arranged that its drive pin is axially immobile and that the thermostat housing executes the expansion and contraction displacements, thereby directly serving as said adjustable stop, in conjunction with a stop arm of the flapper.

In another preferred embodiment of the invention, the thermostatic member is a temperature-responsive bimetallic spiral which produces rotational displacements of a coaxially arranged spiral-shaped disc cam on a rotational axis which is parallel to the flapper pivot axis. The disc cam thereby serves as an adjustable stop, in cooperation with a stop arm of the flapper. The fact that the bimetallic spiral executes its rotational displacements with very little force is compensated for by the particular cam arrangement which is self-locking, i.e. the stop arm of the flapper, when abutting against the cam, will not rotate the disc cam.

BRIEF DESCRIPTION OF THE DRAWING

Further special features and advantages of the invention will become apparent from the description following below, when taken together with the accompanying drawing which illustrates, by way of example, two embodiments of the invention, represented in the various figures as follows.

DESCRIPTION OF THE PREFERRED EMBODIMENTS

Figure 1:
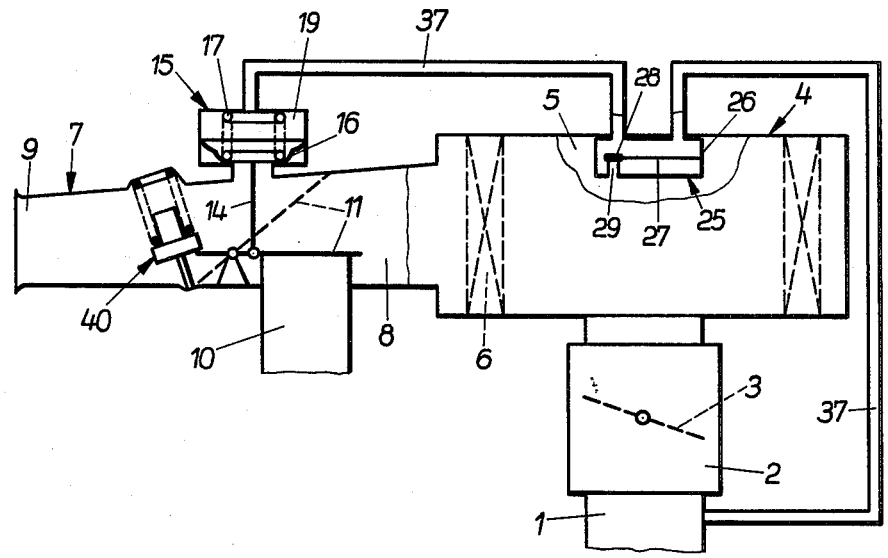
FIG. 1 shows, in a schematic representation, an air intake system for a carburetor-equipped internal combustion engine, incorporating therein the temperature regulating device of the present invention.

Referring to FIG. 1 of the drawing, there is shown, in a schematic representation, a combustion air intake system for an internal combustion engine, the latter being presumed known and therefore not shown in the drawing. The various components of the air intake system are mounted on top of an air intake manifold 1 and a carburetor 2 whose pivotable main throttle 3 is indicated symbolically by a dotted line. The angular position of the main throttle 3 controls the amount of air which is being admitted into the intake manifold 1, thereby determining the power output of the internal combustion engine.

On top of the carburetor 2 is mounted an air intake filter 4, likewise of known design, having a ring-shaped filter element 6 through which the combustion air flows radially inwardly into a clean air space 5 which communicates with the carburetor 2. An air intake snorkel 7 leads from the outside into the housing of the air intake filter 4, in a radial or tangential orientation to the latter. The air intake snorkel 7 represents a generally straight, outwardly open duct structure consisting of a cold air intake duct 9 which forms the entrance portion of the air intake snorkel, a raw air mixing duct 8 which forms the connecting portion of the duct structure with the filter housing, and a duct junction, where a warm air intake duct 10 opens into the duct structure from below.

Figure 2:
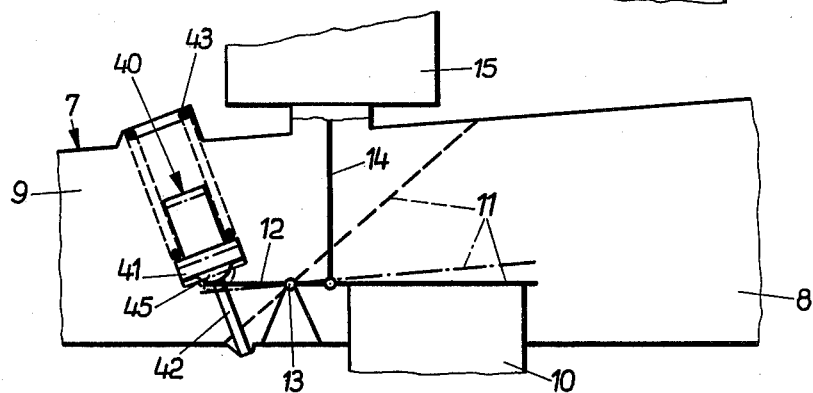
FIG. 2 shows an enlarged detail of the air intake system of FIG. 1.

The warm air intake duct 10 reaches a short distance into the duct structure, thereby forming a flat inlet seat against which a pivotable flapper 11 is seated so as to close the inlet of the warm air intake duct 10 (see also FIG. 2). The warm air intake duct receives preheated raw air from a suitable exhaust stove. The design and arrangement of such an exhaust stove is well known, and the latter has therefore been omitted from the drawing. The flapper 11 is a generally flat member which is pivotally supported at the pivot axis 13 (FIG. 2) and which, in the end position shown in the drawing, opens the cold air duct 9 to the raw air mixing duct 8 while closing the inlet of the warm air duct 10 and, in a second end position shown in dotted lines, closes the cold air duct 9, while opening the warm air duct 10 to the raw air mixing duct 8.

Intermediate air flow proportioning positions of the flapper 11 are adjusted by means of a pneumatic membrane actuator 15 whose drive rod 14 is connected to the flapper 11, at a short distance from its pivot axis 13. The rubber membrane 16 of the pneumatic actuator 15, responding to the presence of negative air pressure in the control pressure space 19, pulls the drive rod 14 upwardly, in opposition to the actuator return spring 17, thereby angularly repositioning the flapper 11 in the direction of its second end position. As a result of such a flapper displacement, the flapper 11 will admit less cold raw air and more warm raw air into the raw air mixing duct 8.

A vacuum line 37 leads from a point downstream of the main throttle 3 to the control pressure space 19 of the membrane actuator 15. Between its two end connections, the vacuum line 37 passes through a thermostat-controlled pressure relief valve 25 which is mounted inside the housing of the air intake filter 4 in such a way that a temperature-responsive bimetallic member 27 of the relief valve is exposed to the incoming raw air in the clean air space 5 of the air intake filter 4.

The bimetallic member 27 of the relief valve 25 is mounted in a cantilever-type attachment inside the valve housing 26, controlling on its free extremity a valve element 28 which adjustably opens and closes a relief port 29 leading into the clean air space 5. The temperature-reflecting position of the bimetallic member 27 thus determines to what extent the negative pressure inside the vacuum line 37 is reduced by allowing air to enter through the relief port 29. This reduction in the negative pressure which is transmitted to the pneumatic membrane actuator 15 brings about a corresponding angular shift of the flow proportioning flapper 11.

A tiny vent hole (not shown) in the wall of the valve housing 26, not large enough to noticeably reduce the negative pressure in the vacuum line 37, allows for a small air flow from the clean air space 5 into the valve housing 26, so that temperature changes in the clean air space 5 will be transmitted to the bimetallic member 27 inside of the valve housing 26. A detailed disclosure of such a thermostatic pressure relief valve is contained in U.S. Pat. No. 3,830,210, for example.

In the cold air intake duct 9 is further arranged a temperature-responsive unit which serves as a position-adjustable stop, in cooperation with a stop arm 12 of the flapper 11. In the embodiment of FIGS. 1 and 2, this temperature-responsive unit is a wax thermostat 40 with a thermostat housing 41 and an axially extending thermostat drive pin 42. The distal extremity of the pin 42 is fixedly positioned and supported in a depression in the bottom portion of the cold air intake duct 9. A compression spring 43, seated with one end portion on the thermostat housing 41, engages with its opposite extremity a positioning recess in the upper portion of the cold air intake duct 9, thereby holding the temperature-responsive unit in place, while allowing for the wax thermostat 40 to expand and contract in the axial direction. As will be readily understood from the drawing, an extension or contraction of the wax thermostat 40 will reflect itself in an axial, i.e. vertical, displacement of the thermostat housing 41 against the compression spring 43. The housing 41, by thus moving into the path of the stop arm 12 of the flapper 11, when the thermostat contracts, serves as a position-adjustable stop, blocking the warm air duct closing motion of the flapper 11 in an angular position which reflects the temperature of the incoming cold raw air.

In the following will be described the operating characteristics of the proposed intake air temperature regulating device, under different engine output conditions and ambient temperatures.

In a situation where the ambient temperature is at or above the optimal temperature level for carburetion and combustion, the bimetallic member 27 of the thermostat-controlled pressure relief valve 25 is curved upwardly, so as to lift the valve element 28 from the relief port 29, thereby preventing the buildup of a negative pressure in the control pressure space 19 of the pneumatic membrane actuator 15, even though a suction effect may be present in the air intake manifold 1. In the absence of such a negative pressure acting on the rubber membrane 16, the actuator return spring 17 will maintain the drive rod 14 extended to the fullest, thereby closing the flapper 11 against the inlet opening of the warm air intake duct 10. And, because the temperature of the raw air entering through the cold air intake duct 9 is comparatively high, the wax thermostat 40 reflects this condition by an axial extension which has lifted the thermostat housing 41 to a position in which it clears the path of the flapper stop arm 12. This thermostat position is shown in FIGS. 1 and 2. It can thus be seen that, when the ambient air temperature is at or above the optimal level, the warm air intake duct 10 remains closed, regardless of the engine output load, as reflected by the position of the main throttle 3.

At a lower than optimal ambient air temperature, the bimetallic member 27 of the relief valve 25 moves to close the valve element 28 against the relief port 29, thereby transmitting negative pressure from the intake manifold 1 to the pneumatic membrane actuator 15, via the vacuum line 37. Assuming now that the engine operates at low output, as when the main throttle 3 is almost closed, then the vacuum line 37 will transmit an elevated negative pressure to the control pressure space 19. The membrane 16 responds to this negative pressure by pulling the drive rod 14 upwardly, against the return spring 17, so that the flapper 11 will reduce, or completely shut off, the intake of cold raw air through the cold air duct 9, while opening the warm air duct 10 for the intake of preheated raw air. This operating condition is typical for a cold start operation in cold weather. As warmer air reaches the clean air space 5 of the air intake filter 4, it also penetrates the valve housing 26, where the bimetallic member 27 responds to the increase in temperature by curving upwardly. If the temperature of the raw air is too high, the member 27 will open the relief port 29 by a small amount, thereby reducing the negative pressure in the pneumatic actuator 15. The latter will respond to this pressure change by allowing its return spring 17 to lower the flapper 11 to an intermediate position in which both cold raw air and warm raw air are admitted into the raw air mixing duct 8. The action of the thermostat-controlled pressure relief valve 25 thus automatically adjusts the flapper 11 to a position in which the intake flow rates of cold and preheated raw air are such that the resultant air mixture has an optimal temperature.

This situation changes, when the main throttle 3 of the carburetor 2 is opened wide, as when the engine is subjected to full load output. When this happens, the negative pressure in the air intake manifold 1 disappears almost completely, i.e. the difference between the negative pressure level in the manifold 1 and the negative pressure level inside the cold air intake duct 9 is so insignificant that the pneumatic membrane actuator 15 will relax completely, allowing its return spring 17 to lower the flapper 11 all the way towards closure against the inlet of the warm air intake duct 10. This closing motion will be interrupted, however, through the action of the wax thermostat 40 which, because of the low temperature of the incoming raw air, has contracted in the axial sense, so that the flapper stop arm 12 abuts against the thermostat housing 41 in a flapper position in which the warm air intake duct 10 remains partially open. Such a position is shown by a stippled line in FIG. 2. The degree to which the warm air intake duct 10 is held open by the stop action of the wax thermostat 40 depends on the ambient air temperature.

By thus preventing the closing of the warm air intake duct 10 under full load operation of the engine, the device of the invention reliably precludes the development of carburetor icing conditions which tends to happen, when only cold air is sucked into the system. It should also be noted that, under full load operation, the exhaust stove supplies hotter preheated air to the warm air intake duct 10, so that even a comparatively small flow of preheated raw air will raise the air temperature sufficiently to prevent carburetor icing.

An internal combustion engine equipped with the intake air temperature regulating device of the invention will thus offer advantages during cold start operation, by accelerating the engine warmup process, and it will also perform with improved full load operation, the colder raw air giving excellent volumetric intake efficiency, without being subject to the risk of carburetor icing.

Figure 3:
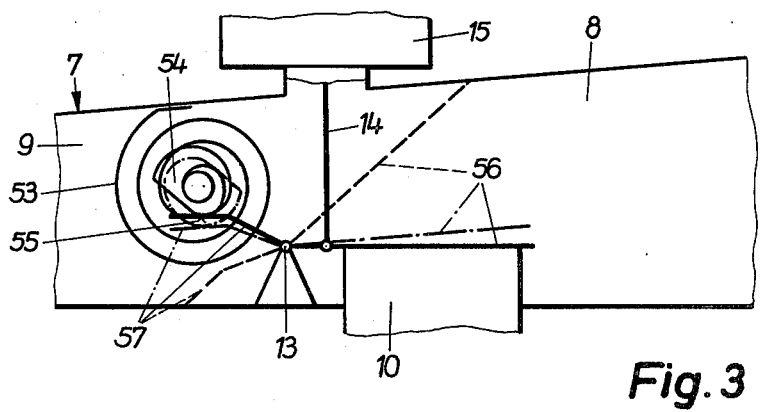
FIG. 3 shows a modified embodiment of the temperature regulating device of FIGS. 1 and 2.

In FIG. 3 is shown an embodiment of the invention which is generally similar to the previously described embodiment, but has a different temperature-responsive unit in the cold air intake duct 9. In the place of the earlier wax thermostat, this unit features a temperature-responsive member in the form of a bimetallic spiral 53 whose outer extremity if attached to the upper wall of the cold air intake duct 9 and whose inner extremity is connected to a rotatable cam 54, on a rotational axis which is preferably parallel to the pivot axis 13 of the flow proportioning flapper 56. The cam 54 is of the disc type, having a spiral-shaped cam rise 55 which acts as a position-adjustable stop, in cooperation with a kinked stop arm 57 of the flapper 56.

The operation of this temperature-responsive unit is similar to that of the previously described wax thermostat unit: A decrease in the ambient air temperature causes the bimetallic spiral 53 to rotate the cam 54 in a clockwise direction, thereby engaging the flapper stop arm 57 with a higher point on the cam rise 55, so that the closing movement of the flapper 56 against the warm air intake duct 10 is stopped in a partially open position, as shown by a stippled line in FIG. 3. While the bimetallic spiral 53 produces only a very low adjustment torque on the cam 54, this disadvantage is not detrimental to the operation of the device, as the cam 54 does not have to rotate against resistance. On the other hand, the spiral-shaped cam rise 54 is self-locking, i.e. non-reversible in its force transmission, meaning that the abutment action of the flapper stop arm 54 against the cam rise 54 cannot produce a rotating action of the cam 54.

As in the previously described embodiment, the pneumatic membrane actuator 15 and the thermostat-controlled relief valve 25 determine the flapper position at idle and partial load of the engine, the bimetallic spiral 53 and the stop cam 54 preventing carburetor icing, under full load operation at low ambient temperatures.

It should be understood, of course, that the foregoing disclosure describes only preferred embodiments of the invention and that it is intended to cover all changes and modifications of these examples of the invention which fall within the scope of the appended claims.

We claim the following:

1. A device for regulating the intake air temperature of an internal combustion engine which is equipped with a carburetor in its air intake system, an air filter upstream of the carburetor, and, leading to the air filter, a cold air intake duct for raw air of ambient temperature, a warm air intake duct for preheated raw air coming from an exhaust stove or the like, and a duct junction through which the two intake ducts open into a raw air mixing duct which connects them to the air filter, the duct junction having associated therewith an air flow proportioning valve which, in a first end position, opens the cold air duct while closing the warm air duct and, in a second end position, closes the cold air duct, while opening the warm air duct, the air temperature regulating device comprising in combination:

a pneumatic actuator operatively connected to the air flow proportioning valve in such a way that negative air pressure supplied to the actuator will move the valve in the direction towards said second end position, in opposition to a return spring biasing the valve towards said first end position;

a vacuum line supplying negative air pressure to the pneumatic actuator from a point downstream of the carburetor;

a temperature-controlled pressure relief valve arranged in the vacuum line, at a point at which a temperature-responsive element of the relief valve is exposed to the proportioned flow of raw air which moves from the duct junction to the carburetor, the relief valve being so adjusted that an increase in the temperature of the proportioned flow of raw air progressively increases the opening of a relief port in the vacuum line, thereby correspondingly reducing the negative pressure which is being supplied to the pneumatic actuator, with the result that the return spring will shift the air flow proportioning valve more towards said first end position;

a position-adjustable stop cooperating with the air flow proportioning valve so as to block the return-spring-induced valve movement in the direction towards the first end position, at varying distances from said end position; and temperature-responsive stop positioning means, including a temperature-responsive element which is exposed to raw air of ambient temperature.

2. An intake air temperature regulating device as defined in claim 1, wherein
the temperature-responsive element of the stop positioning means is arranged inside the cold air intake duct, upstream of the duct junction.

3. An intake air temperature regulating device as defined in claim 2, wherein
the cold air intake duct and the raw air mixing duct form a substantially continuous duct structure on opposite sides of the duct junction, while the warm air intake duct forms a lateral inlet into said duct structure at the duct junction;
the air flow proportioning valve includes a pivotable flapper whose pivot axis is located a short distance upstream of the duct junction, on the side of the inlet of the warm air intake duct; and
the flapper includes a stop arm which is engageable by the position-adjustable stop.

4. An intake air temperature regulating device as defined in claim 3, wherein the stop arm of the flapper extends in an upstream direction from the flapper pivot axis; and the temperature-responsive stop positioning means is an elongated, axially expanding wax thermostat which is arranged inside the cold air intake duct, in an orientation which is substantially transverse to the flapper pivot axis.

5. An intake air temperature regulating device as defined in claim 4, wherein the wax thermostat includes a thermostat housing containing the temperature-responsive element and a thermostat drive pin extending axially from the housing a variable distance which reflects the temperature to which said element is exposed;

the distal axial end of the thermostat drive pin is fixedly positioned and supported against that side of the cold air intake duct on which are located the flapper pivot axis and the inlet of the warm air intake duct; and the thermostat housing executes axial displacements reflective of temperature changes, moving against a compression spring whose distal end is engaged against the opposite side of the cold air intake duct, the thermostat housing thereby serving as said position-adjustable stop, cooperating with the stop arm of the flapper.

6. An intake air temperature regulating device as defined in claim 3, wherein the temperature-responsive stop positioning means is a thermostat having a bimetallic spiral as a temperature-responsive element; and the position-adjustable stop is a rotatable member whose angular position is determined by the angular displacements of one end of said bimetallic spiral.

7. An intake air temperature regulating device as defined in claim 6, wherein the stop arm of the flapper extends in an upstream direction from the flapper pivot axis; and the position-adjustable stop is a rotatable cam with a spiral-like radial cam rise which is engageable by said stop arm, the rotational axis of the cam and of the bimetallic spiral being substantially parallel to the flapper pivot axis.

* * * * *